(12) United States Patent
Borer et al.

(10) Patent No.: US 7,291,694 B1
(45) Date of Patent: Nov. 6, 2007

(54) METHOD AND DEVICE FOR PRODUCING CRYSTALLIZABLE PLASTIC MATERIAL

(75) Inventors: Camille Borer, Flurlingen (CH); Martin Mueller, Uzwil (CH); Frank Gloeckner, Aschaffenburg (DE)

(73) Assignees: Buehler AG, Uzwil (CH); Rieter Automatik GmbH, Grossostheim (DE)

( * ) Notice: Subject to any disclaimer, the term of this patent is extended or adjusted under 35 U.S.C. 154(b) by 0 days.

(21) Appl. No.: 10/049,549

(22) PCT Filed: Jun. 9, 2000

(86) PCT No.: PCT/CH00/00317

§ 371 (c)(1),
(2), (4) Date: May 17, 2002

(87) PCT Pub. No.: WO01/12698

PCT Pub. Date: Feb. 22, 2001

(30) Foreign Application Priority Data

Aug. 18, 1999 (DE) ................. 199 38 583

(51) Int. Cl.
*C08F 6/00* (2006.01)
(52) U.S. Cl. .................. 528/480; 264/8; 528/271; 528/272; 528/285; 528/308.2; 528/481

(58) Field of Classification Search ............. 528/308.2, 528/480, 481, 271, 272, 285; 264/8
See application file for complete search history.

(56) References Cited

U.S. PATENT DOCUMENTS

| 4,609,721 | A | * | 9/1986 | Kirshenbaum et al. | ..... 528/285 |
|---|---|---|---|---|---|
| 4,839,969 | A | * | 6/1989 | Hahn | .......... 34/169 |
| 5,424,346 | A | * | 6/1995 | Sinclair | ...... 524/108 |
| 6,436,322 | B1 | * | 8/2002 | Fredl | .......... 264/85 |
| 6,524,702 | B1 | * | 2/2003 | Betso et al. | ........ 428/379 |

FOREIGN PATENT DOCUMENTS

DE          19919357          * 11/2000

* cited by examiner

*Primary Examiner*—Terressa Boykin
(74) *Attorney, Agent, or Firm*—Reed Smith LLP

(57) ABSTRACT

A method for manufacturing a crystallizable plastic material is disclosed. The process includes the step of melting an amorphous plastic material, pelletizing the material, crystallizing it and then post condensing the plastic material with the proviso that the plastic material is not subjected to heating after the melting step but prior to the crystallization step and then subjecting the plastic material to sieving after the crystallization step.

14 Claims, 1 Drawing Sheet

METHOD AND DEVICE FOR PRODUCING CRYSTALLIZABLE PLASTIC MATERIAL

This application is a 371 of PCT/CH00/00317 filed Jun. 9, 2000.

BACKGROUND OF THE INVENTION

The present invention relates to a procedure for manufacturing crystallizable plastic material, e.g., polyesters and the like, and in particular polyethylene terephthalate (PET), via post-melting phase crystallization and solid-phase post-condensation, and a device for executing the procedure.

The crystallization and post-condensation in the solid-phase (SSP) of polyesters obtained from a melt, in particular PET (polyethylene terephthalate), is generally known. In this case, the melted polyester (melting point 270° C. and [above] higher) is processed into cylindrical pellets, for example, while simultaneously cooled down to room temperature, and serves as an amorphous starting material for subsequent crystallization and post-condensation to PET. According to EP-A-379684, for example, crystallization takes place in two fluidized beds (combination of boiling and spouting beds) at temperatures of 140° C. to 180° C. Crystallization is followed by exposure to impact to dissolve agglomerates.

However, it is also known that crystallization can take place at a temperature of less than 140° C. and solid-state post-condensation can take place at a temperature exceeding 180° C. (e.g., according to the unpublished CH 02131/92-2).

EP-A-822214 describes a procedure in which a polymer material is extruded, pelleted and crystallized without cooling the melt to a temperature far below the crystallization temperature. In this case, a temperature of approx. 160° C. to 220° C. is maintained, and crystallization takes approx. 5-30 minutes. However, WO 97/23543 discloses this omission of strong cooling off during pelleting. Polyester is kept in a melt at approx. 270° C., and drips through a hole onto a hot (approx. 135° C.) metal plate, where crystallization has already taken place. A conventional SSP process then follows this for 24 hours at approx. 205° C. According to U.S. Pat. No. 5,510,454, the temperature of the plate that receives the drops can also measure 180° C.

Also known is a procedure for the simultaneous drying and crystallization of thermoplastics, e.g., PET according to WO94/25239, wherein plastic strands to be dried are quenched for at most 1.5 seconds to achieve a surface temperature of at least 100° C. This partial cooling of the plastic only reduces the crystallization time down to approx. 20 seconds at most.

In a device for manufacturing polyamides according to DE-A-19510698, a moving-bed reactor can be evacuated, wherein a vacuum pump can be provided with a separator for separating dust from the waste gas. However, solid foreign substances, dusts and the like are not reliably removed from the plastic material.

Further, U.S. Pat. No. 3,405,098 describes a procedure for preparing linear condensation polyesters for solid phase polymerization, wherein the melt is quickly quenched in order to obtain an essentially amorphous, solid polyester, which is subsequently heated to 150° C. to 200° C. again, in order to obtain a partially crystallized polyester, which is subsequently milled into fine particles, and classified using sieves. The polyester prepared in this way is then subjected to solid-phase polymerization in a fluidized bed.

SUMMARY OF THE INVENTION

One of the objects of the present invention is to further develop a procedure for manufacturing crystallizable plastic material, such as polyester or PET, in such a way as to achieve a higher reactivity in the SSP process through larger crystallites and improved surface crystal structure, and to reliably separate solid foreign substances from the plastic material after crystallization.

Another object of the present invention is to lower power consumption. This is accomplished based upon the features described in the claims.

Another object of the present invention is to provide a suitable device for executing the above procedure.

DETAILED DESCRIPTION OF THE INVENTION

Preferred embodiments of the present invention are described in the claims.

Figure 1:
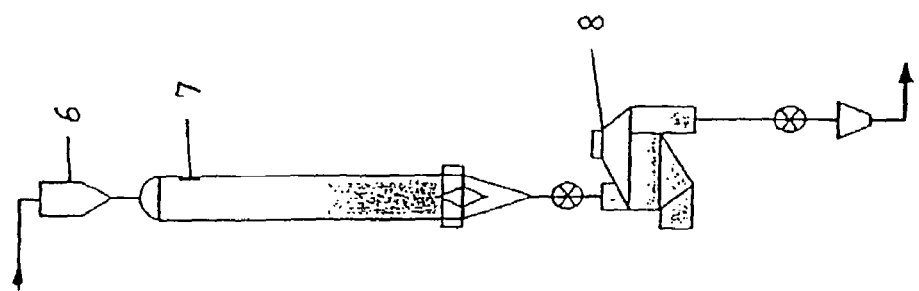
FIG. 1 shows a schematic view of an embodiment of the present invention.
Figure 1:
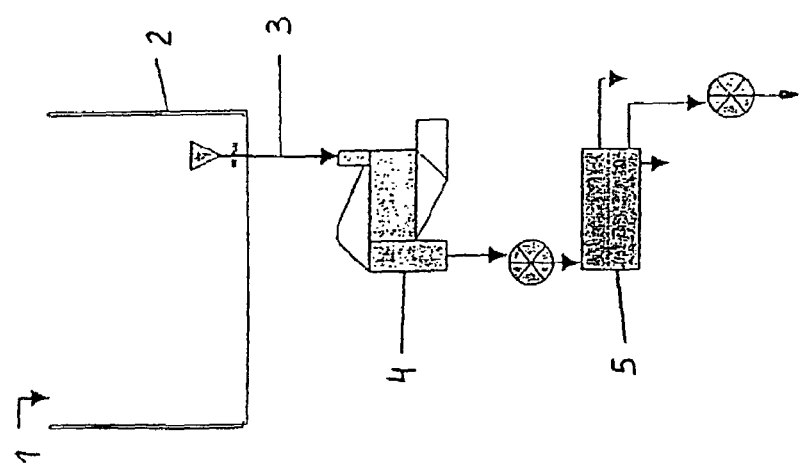

The present invention shall be described in greater detail based upon the embodiment shown in FIG. 1. FIG. 1 shows a schematic view of the embodiment.

In particular, PET 1 exits a melt reactor (not shown) and enters a cutter 2 at a temperature of approx. 280° C. while being cooled and solidified.

The amorphous pellets 3 having a temperature of 140° C. to 180° C. generated in this way then pass to a fluidized bed 4 without further cooling, and subsequently to a sieve 5, which can be followed by a recirculating air sifter if required, in order to separate out dust and other foreign solids.

According to EP-A-379684, the fluidized bed 2 can also be a combination of boiling and spouted beds. If need be, the sieving process is followed by more crystallization (not shown).

The PET cleaned and crystallized passes in a conventional manner to a preheater 6 or directly to a shaft reactor 7, where the solid phase post-condensation into PET takes place, and only thereafter are the pellets cooled to room temperature in a cooler 8.

What is claimed is:

1. A process for manufacturing crystallizable polyester comprising:
   (a) providing amorphous polyester from a melt reactor;
   (b) pelletizing the polyester;
   (c) crystallizing the polyester at a temperature of 140° C. to 180° C.; and
   (d) post-condensing the polyester;
   wherein the polyester is not subjected to heating after step (a) and prior to the crystallization step and the polyester is subjected to sieving after the crystallization step.

2. The process according to claim 1 wherein the polyester is polyethylene terephthalate.

3. A device for manufacturing crystallizable polyester for executing a process according to claim 1, the device comprising a pelletizer, a fluidized bed (4) and a shaft reactor (7), wherein a sieve (5) is placed downstream from the fluidized bed (4).

4. The device according to claim 3, wherein the polyester is polyethylene terephthalate.

5. A process for manufacturing crystallizable polyester comprising:
 (a) providing amorphous polyester from a melt reactor;
 (b) crystallizing the polyester at 140° C. to 180° C.;
 (c) pelletizing the polyester; and
 (d) post-condensing the polyester;
wherein the polyester is not warmed again after step (a) and prior to the crystallization step and the is subjected to sieving after the pelletization step at roughly the same temperature as during the crystallization step and the pelletization step.

6. The process according to claim 5, wherein the temperature during the pelletization step and the sieving step is between 100° C. and 200° C.

7. The process according to claim 5, wherein the temperature during the pelletization step and the sieving step is between 120° C. and 160° C.

8. The process according to claim 5, wherein retention time during the crystallization step is approximately 1 to 40 seconds.

9. The process according to claim 5, wherein retention time during the crystallization step is approximately 2 to 20 seconds.

10. The process according to claim 5, wherein the sieving step is followed by a second crystallization step.

11. The process according to claim 5, wherein the polyester is polyethylene terephthalate.

12. A device for manufacturing crystallizable polyester, for executing a process according to claim 5, comprising a first crystallizer and a downstream cutter (2), wherein a sieve (5) is placed downstream from the cutter (2).

13. The device according to claim 12, wherein a second crystallizer is placed downstream from the sieve (5).

14. The device according to claim 12, wherein the polyester is polyethylene terephthalate.

* * * * *